(12) United States Patent
Wei et al.

(10) Patent No.: US 8,334,925 B2
(45) Date of Patent: Dec. 18, 2012

(54) METHOD AND APPARATUS FOR BACKLIGHT COMPENSATION OF AN IMAGE

(75) Inventors: Xiaoxia Wei, Shenzhen (CN); Yanbo Long, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 174 days.

(21) Appl. No.: 12/875,540

(22) Filed: Sep. 3, 2010

(65) Prior Publication Data

US 2011/0013048 A1 Jan. 20, 2011

Related U.S. Application Data

(63) Continuation of application No. PCT/CN2009/071670, filed on May 7, 2009.

(30) Foreign Application Priority Data

May 13, 2008 (CN) .......................... 2008 1 0106436

(51) Int. Cl.
H04N 5/238 (2006.01)
H04N 9/73 (2006.01)
(52) U.S. Cl. ........................ 348/366; 348/227.1; 348/602
(58) Field of Classification Search .................. 348/234, 348/274, 362
See application file for complete search history.

(56) References Cited

U.S. PATENT DOCUMENTS

| | | | |
|---|---|---|---|
| 6,507,372 B1 * | 1/2003 | Kim ............................ | 348/630 |
| 6,542,138 B1 | 4/2003 | Shannon et al. | |
| 6,694,051 B1 | 2/2004 | Yamazoe et al. | |
| 7,154,468 B2 | 12/2006 | Linzmeier et al. | |
| 7,428,021 B2 * | 9/2008 | Fukuda ......................... | 348/650 |
| 7,454,137 B2 * | 11/2008 | Lee et al. ....................... | 396/282 |
| 8,207,931 B2 * | 6/2012 | Zhang et al. ................... | 345/102 |
| 2002/0122020 A1 | 9/2002 | Moon et al. | |
| 2004/0022434 A1 * | 2/2004 | Yamazoe et al. .............. | 382/168 |

(Continued)

FOREIGN PATENT DOCUMENTS

CN 1543201 A 11/2004

(Continued)

OTHER PUBLICATIONS

Extended European Search Report issued (mailed) Jun. 27, 2011, issued in related Application No. 09745402.9 PCT/CN2009071670, Huawei Technology Co., Ltd.

(Continued)

Primary Examiner — Hung Lam
(74) Attorney, Agent, or Firm — Leydig, Voit & Mayer, Ltd.

(57) ABSTRACT

A method and an apparatus for processing images are disclosed. The method includes: generating an image histogram of an image to be processed; judging whether the image to be processed requires backlight compensation according to the image histogram; if the image to be processed requires backlight compensation, determining a first luminance boundary value A used for deciding whether to perform backlight compensation and a second luminance boundary value C used for deciding whether to perform positive or negative backlight compensation; and performing backlight compensation for the image to be processed according to the first luminance boundary value A and the second luminance boundary value C. The method is simple and universally applicable. After backlight compensation, the contrast of the image is high, and the image is free from background overexposure and image layering. The image photographed in a backlight environment is processed properly.

8 Claims, 6 Drawing Sheets

U.S. PATENT DOCUMENTS

| | | |
|---|---|---|
| 2004/0184673 A1 | 9/2004 | Watanabe |
| 2004/0239796 A1 | 12/2004 | Imai |
| 2005/0141763 A1 | 6/2005 | Matsushima |
| 2008/0074510 A1 | 3/2008 | Chen |

FOREIGN PATENT DOCUMENTS

| | | |
|---|---|---|
| CN | 1750602 A | 3/2006 |
| CN | 101282425 A | 10/2008 |
| CN | 101582991 B | 2/2011 |
| EP | 1 473 925 A2 | 11/2004 |
| JP | 2001242504 A | 9/2001 |
| JP | 2004235956 | 8/2004 |
| JP | 2007-11430 | 1/2007 |
| JP | 2008048251 | 2/2008 |

OTHER PUBLICATIONS

Written Opinion of the International Searching Authority (translation) dated (mailed) Aug. 13, 2009, issued in related Application No. PCT/CN2009071670, filed May 7, 2009, Huawei Technologies Co., Ltd.

International Search Report from P.R. China in International Application No. PCT/CN2009/071670 mailed Aug. 13, 2009.

* cited by examiner

METHOD AND APPARATUS FOR BACKLIGHT COMPENSATION OF AN IMAGE

CROSS-REFERENCE TO RELATED APPLICATIONS

This application is a continuation of International Application No. PCT/CN2009/071670, filed on May 7, 2009, which claims priority to Chinese Patent Application No. 200810106436.3, filed on May 13, 2008, both of which are hereby incorporated by reference in their entireties.

FIELD OF THE INVENTION

The present invention relates to digital signal processing technologies, and in particular, to a method and an apparatus for backlight compensation of an image.

BACKGROUND

With the development of information technologies, more and more digital terminals provide photographing and videorecording functions, for example, portable videorecorder, portable camera, mobile terminal with photographing and/or videorecording functions, telephone terminal with the videophone function, and videoconference terminal. Such terminals include a processor for processing the image and video data obtained by an image or video obtaining apparatus. At the time of obtaining the image or video, when the target which is photographed exists before a bright background or light source, the target which is photographed is in the backlight state. The images or videos obtained in the backlight state have a bright background but the foreground target is very dim. The images or videos obtained in a backlight environment are so deteriorated that the targets are hardly distinguishable. For example, the portrait in an image or a video photographed in the backlight state is so dim that the figures in the image or video are hardly distinguishable.

After an image or a video is obtained in a backlight environment, the image or video may undergo backlight compensation, or also known as backlight correction. The backlight compensation is performed by using two methods. One method is: The exposure intensity is controlled at the time of videorecording or photographing; at the time of photographing, a component like a light detector is used to detect whether the target is in a backlight environment, and, if the target is in a backlight environment, the light detector generates a signal for controlling the camera to flash forcibly or the exposure time of the photographing is prolonged. In this way, the luminance of the target can be increased. Such a method is defective in that: When the luminance of the target is increased, the luminance of the background is also increased so that the bright background is overexposed, the background part takes on large white patches, and the details of the background are not distinguishable. Moreover, because such a method intensifies the exposure of the entire image or video, the contrast of the image or video is deteriorated seriously.

The other method is: By using a signal processing method, the signals of a photographed image or video are reprocessed. One technical solution is: First, the backlight parameter based on the average luminance difference of the image and the backlight parameter based on the image histogram are obtained, and the total backlight parameter of the image is obtained according to such two backlight parameters. Then, the background importance parameter of the image is obtained. Finally, the total backlight parameter, the background importance parameter, the average luminance of the image are used as inputs, a compensation rate is output according to scores of blur rules specified beforehand, and the entire image undergoes luminance compensation by using the compensation rate. The method is defective in the following:

(1) Scores of blur rules are formulated according to the blur logic control method to obtain a compensation rate, which is rather complicated.

(2) The image needs to be sectioned to obtain the backlight parameter based on the average luminance difference of the image and the backlight parameter based on the image histogram, which is not much universally applicable.

(3) Because a compensation rate is used to compensate for the luminance of the entire image, the contrast of the image is deteriorated.

Another technical solution of the preceding method is: An image is divided into a background area and a target area; the mean value and the variance of the background area, and the mean value and the variance of the target area are obtained; the four parameters which are obtained are input into the blur system to obtain a compensation rate; the pixel points whose luminance is less than a fixed value undergo backlight compensation at the compensation rate, and the pixel points whose luminance is greater than the fixed value do not undergo backlight compensation; and finally, the image that has undergone backlight compensation is treated through stretch of the contrast to increase the contrast of the image. The method is defective in the following:

(1) The compensation rate is determined by means of blur logic control, which is rather complicated.

(2) The pixel points whose luminance is less than a fixed value undergo backlight compensation at the same compensation rate, which is known as linear compensation and leads to loss of the chromatic information of the image.

(3) The pixel points whose luminance is less than a fixed value undergo backlight compensation but the pixel points whose luminance is greater than a fixed value undergo no backlight compensation, and therefore, the luminance of the pixel point which has undergone backlight compensation and corresponds to the original fixed-value luminance may deviate from the original fixed-value luminance by far, and the entire image is layered and the luminance is discontinuous after the backlight compensation.

(4) The contrast stretch leads to too high luminance of the target.

SUMMARY

The embodiments of the present invention provide a method and an apparatus for backlight compensation of an image.

The method for backlight compensation of an image includes:

generating an image histogram of an image to be processed;

judging whether the image to be processed requires backlight compensation according to the image histogram;

if the image to be processed requires backlight compensation, determining the first luminance boundary value A used for deciding whether to perform backlight compensation and the second luminance boundary value C used for deciding whether to perform positive or negative backlight compensation; and performing backlight compensation for the pixel points whose luminance level falls within [0, C] and (C, A] in the image to be processed.

The apparatus for backlight compensation of an image includes:

an image histogram generating unit, adapted to generate an image histogram of an image to be processed;

a backlight compensation judging unit, adapted to judge whether the image to be processed requires backlight compensation according to the image histogram of the image to be processed;

a backlight compensation parameter generating unit, adapted to generate the first luminance boundary value A and the second luminance boundary value C for backlight compensation if the backlight compensation judging unit determines that the image to be processed requires backlight compensation; and a backlight compensation unit, adapted to perform backlight compensation for the image to be processed according to the first luminance boundary value A and the second luminance boundary value C which are generated by the backlight compensation parameter generating unit.

Compared with the prior art, the method and the apparatus for processing an image in the embodiments of the present invention is used to obtain a first luminance boundary value and a second luminance boundary value, and perform backlight compensation for pixel points in different luminance ranges with different compensation functions according to a pixel point luminance range determined by such two luminance boundary values. The backlight compensation is non-linear compensation and does not lead to loss of the chromatic information of the image or too high luminance of the target. Moreover, the following are ensured: the luminance of the pixel point whose luminance level is the first luminance boundary value after backlight compensation is equal to the luminance before compensation, and the luminance of the pixel point whose luminance level is the second luminance boundary value after backlight compensation is equal to the luminance before compensation. The method is simple and universally applicable. After backlight compensation, the contrast of the image is high, and the image is free from background overexposure and image layering. The image photographed in a backlight environment is processed properly.

The present invention is described below in detail with reference to the accompanying drawings and exemplary embodiments.

DETAILED DESCRIPTION OF THE EMBODIMENTS

Figure 1:
FIG. 1 is an image histogram of an image photographed in a backlight environment in an embodiment of the present invention.

An image histogram describes the gray level content of an image. The histogram of any image includes rich information. FIG. 1 shows a histogram of an image involved in a backlight environment in an embodiment of the present invention. In the histogram in FIG. 1, the x-coordinate represents the luminance level of the pixel point in the image, and the y-coordinate represents the number of pixel points corresponding to each luminance level. A peak value in the histogram represents a relatively large number of pixel points corresponding to a luminance level, namely, the "peak" corresponds to a wide area of the same luminance in an image. In a typical portrait backlight environment, the human face and the background environment occupy a majority of the image. In this case, the human face is dim, and is in a dim block area, but the background is very bright, and is in the bright block area. According to the above features of the "peak" in the histogram and many experimental results, the luminance level corresponding to the crest of the highest peak (whose crest value is the largest) in the histogram photographed in a backlight environment is the luminance level of the bright background; the luminance level corresponding to the crest of the second highest peak (whose crest value is second to the average luminance of the image) in the histogram is the dim target face in the image.

Figure 2:
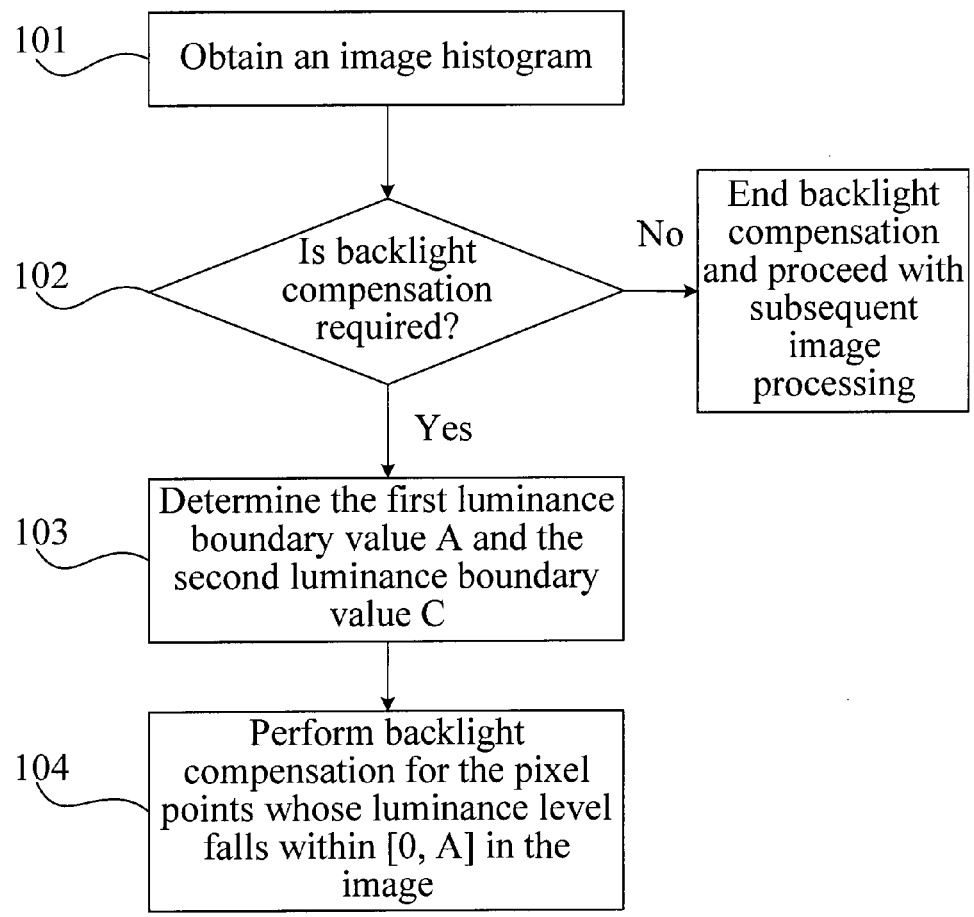
FIG. 2 is a flowchart of a method for processing an image in the first embodiment of the present invention.

Based on such a conclusion, the embodiments of the present invention put forward a method for processing an image to solve the problems of a backlight image. As shown in FIG. 2, the method for processing an image in the first embodiment of the present invention includes the following steps:

Step 101: Generate an image histogram of an image to be processed.

Step 102: Judge whether the image to be processed requires backlight compensation according to the image histogram, and perform step 103 if the image requires backlight compensation, or end the backlight compensation and proceed with the subsequent image processing if the image requires no backlight compensation.

Step 103: Determine the first luminance boundary value A used for deciding whether to perform backlight compensation and the second luminance boundary value C used for deciding whether to perform positive or negative backlight compensation.

Step 104: Perform backlight compensation for the pixel points whose luminance level falls within [0, A] in the image to be processed.

The above steps are detailed below.

Figure 3:
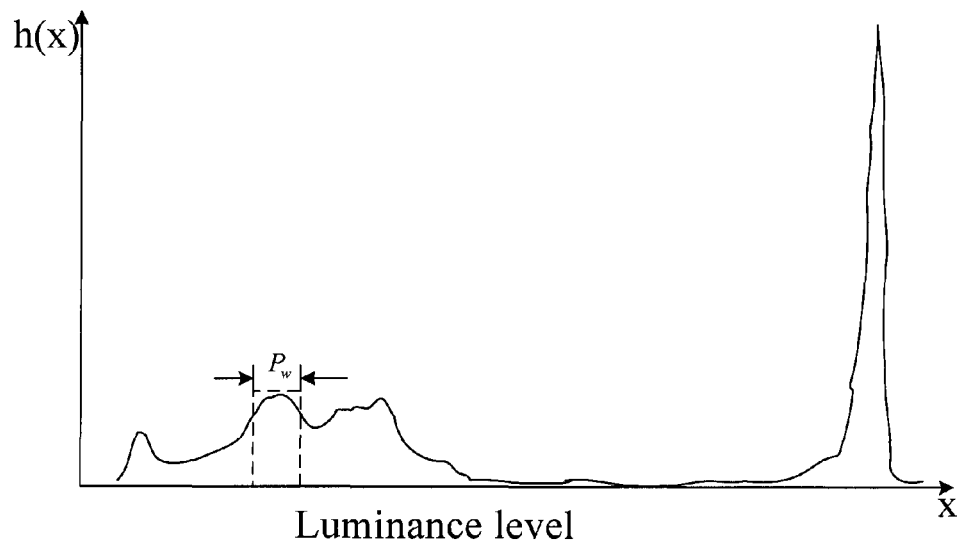
FIG. 3 shows convolution and operation performed for a normalized histogram through a gate sequence in a method for processing an image in an embodiment of the present invention.

As shown in FIG. 1, burr peaks exist in the image histogram. The burr peaks impose interference on the highest peak and the second highest peak in the histogram. Therefore, the histogram needs to be smoothed first by using a convolution sum method. The process of smoothing the histogram is to perform a convolution and an operation for the normalized histogram through a gate sequence. A normalized histogram means: The number of pixel points corresponding to each luminance level in the histogram is normalized to a percentage of the number of the pixel points corresponding to the luminance level to the total number of pixel points of entire image. The histogram shown in FIG. 3 is normalized. FIG. 3 shows the convolution and operation performed for a normalized histogram through a gate sequence in a method for processing an image in an embodiment of the present invention. In FIG. 3, the convolution and operation may be expressed by formula (1):

$$P_s(x) = \sum_{i=x}^{x+P_w-1} h(i) \quad (1)$$

In the formula, x indicates the luminance level of the pixel point in the image, h(x) (equivalent to h(i)) indicates the percentage of the number of pixel points of the luminance level "x" to the total number of the pixel points of the image, $P_w$ indicates the width of the gate sequence, and $P_s(x)$ indicates the sum of the h(i) within the width of the gate sequence. $P_w$ indicates an adjustable value. This value is important to detection of the crest of the histogram. The value 16 of the $P_w$ is recommended, which helps detect the crest accurately.

Figure 4:
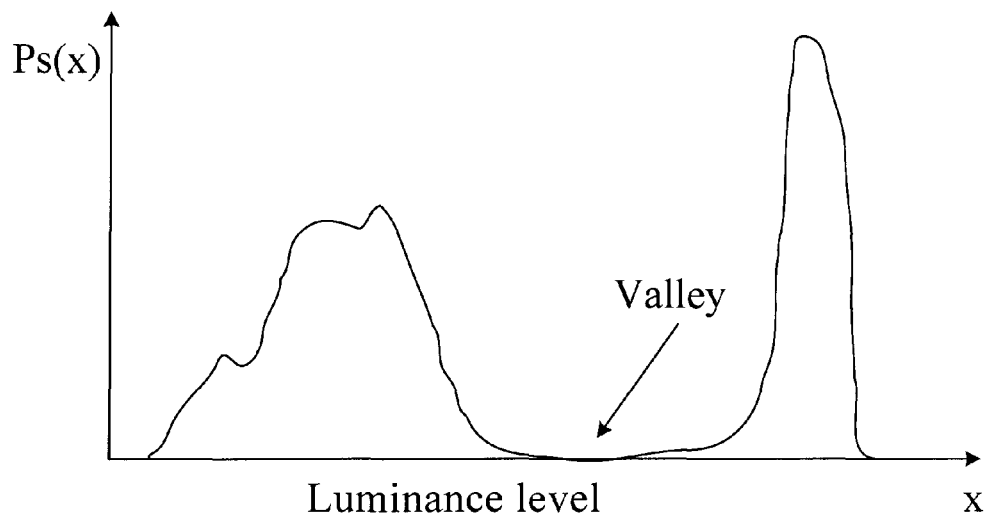
FIG. 4 shows a result of convolution and operation performed for a normalized histogram through a gate sequence in a method for processing an image in an embodiment of the present invention.

FIG. 4 shows a result of convolution and operation performed for a normalized histogram through a gate sequence in a method for processing an image in an embodiment of the present invention. In FIG. 4, the x-coordinate is the luminance level of the pixel point in the image, and the y-coordinate is $P_s(x)$. In this way, the number of pixel points of different luminance levels is reflected accurately, and the highest peak and the second highest peak can be found.

It is worthy of attention that the normalization of the image histogram is not always required. The convolution and operation can be performed for the image histogram through a gate sequence to smooth the image histogram.

After the image histogram is smoothed, the highest peak and the second highest peak in the image histogram need to be found to decide whether to perform backlight compensation for the image. Specifically, based on the curve obtained in FIG. 4, according to the definition of the highest peak and the definition of the second highest peak, the two peaks are found, where the highest peak is the peak with the highest crest value and the second highest peak is the peak in which the luminance level of the pixel point corresponding to the crest value is second to the average luminance of the image. The luminance level $L_1$ of the pixel point corresponding to the crest value of the highest peak and the luminance level $L_2$ of the pixel point corresponding to the crest value of the second highest peak are found. If $L_1-L_2>K$, it is deemed that the background luminance is sharply different from the foreground target luminance, and the image is photographed in a backlight environment and requires backlight compensation.

K is a fixed value, and can be set according to the actual conditions of image processing. Preferably, when K=60, the necessity of the backlight compensation can be determined accurately. If $L_1-L_2 \leq K$, it is deemed that the image is not photographed in a backlight environment, and requires no backlight compensation.

For the image photographed in special environments, although the highest peak can be found in the smoothed histogram, the luminance level of the pixel point corresponding to the crest value of the highest peak is very low (for example, 10), indicating that the pixel point corresponding to the highest peak is not the pixel point in a backlight environment. The process of finding the second highest peak involves the same problem. The luminance level of the pixel point corresponding to the crest value of the second highest peak in the smoothed histogram may be very high (for example, 130), indicating that the pixel point corresponding to the second highest peak is not the foreground target in a dim backlight environment. To make the found highest peak and second highest peak reflect the actual conditions of the image accurately, a rule may be set in finding the highest peak: The luminance level of the pixel point corresponding to the crest value of the highest peak needs to be greater than or equal to 130, and, if the luminance level of the pixel point corresponding to the crest value of the highest peak is less than 130, it is necessary to select a peak among the peaks whose pixel point luminance level is greater than or equal to 130 to serve as the highest peak; the luminance level of the pixel point corresponding to the crest value of the second highest peak needs to be less than or equal to 80, and, if the luminance level of the pixel point corresponding to the crest value of the second highest peak is greater than 80, it is necessary to select a peak among the peaks whose pixel point luminance level is less than or equal to 80 to serve as the second highest peak.

After it is determined that the image requires backlight compensation, the backlight compensation parameters need to be selected to perform backlight compensation. A backlight image is characterized by high luminance of the background and very low luminance of the foreground target. To smooth the image luminance continuously after backlight compensation, the prior art generally compensates for the background image while compensating for the foreground target image, which increases the calculation load and tends to cause background overexposure. A solution is to select a first luminance boundary value that separates the backlight compensation area from the non-backlight compensation area properly, and perform no backlight compensation for the pixel points whose luminance level is higher than the first luminance boundary value, but perform backlight compensation for the pixel points whose luminance level is less than or equal to the first luminance boundary value. In this way, the backlight compensation can be performed for different areas of the pixel points in the image. The first luminance boundary value is determined according to the following rules: (1) The first luminance boundary value is greater than the luminance of any pixel point of the foreground target. For example, for the portrait photographed in a backlight environment, the first luminance boundary value needs to be greater than the luminance of any pixel point on the human face in the portrait. If the selected first luminance boundary value is too high, it is possible that the compensation is also performed for the surrounding pixel points during the backlight compensation for the foreground target. Therefore, the selection of the first luminance boundary value needs to observe this rule: (2) The first luminance boundary value is less than the luminance level corresponding to the crest of the highest peak in the image histogram. Meanwhile, to avoid layering of the image after backlight compensation (namely, the luminance of the image is continuous before compensation, but is discontinuous after compensation), the selection of the first luminance boundary value needs to observe this rule: (3) The number of pixel points corresponding to the first luminance boundary value is as small as practicable. According to the above three rules, a preferable solution provided in an embodiment of the present invention is to select the luminance level corresponding to the first histogram curve minimum value which is immediately left to the highest peak to serve as the first luminance boundary value, namely, the luminance level of the pixel point corresponding to the first "valley" which is left to the highest peak. The arrow in FIG. 4 points to the "valley".

After the first luminance boundary value is determined, backlight compensation can be performed for the pixel points whose luminance level is less than or equal to the first luminance boundary value. If the same function is used to perform backlight compensation for the pixel points whose luminance level is less than or equal to the first luminance boundary value, the contrast of the image may decrease after compensation. Therefore, while the luminance of the foreground target is increased, the luminance of the pixel points whose luminance level is lower than that of the foreground target needs to be decreased. For that purpose, a second luminance boundary value needs to be determined, and negative backlight compensation needs to be performed for the pixel points whose luminance level is less than the second luminance boundary value. That is, the luminance of the pixel points after backlight compensation is lower than the luminance level of the pixel points before backlight compensation. Meanwhile, positive backlight compensation is performed for the pixel points whose luminance level is greater than or equal to the second luminance boundary value. That is, the luminance of the pixel points after backlight compensation is higher than the luminance level of the pixel points before backlight compensation.

The second luminance boundary value is determined according to these rules: The second luminance boundary value is less than the luminance level of any pixel point of the foreground target, namely, less than the luminance level of the pixel point corresponding to the crest value of the second highest peak in the image histogram; taking a portrait photographed in a backlight environment as an example, the second luminance boundary value needs to be less than the luminance level of any pixel point in the portrait. However, if the second luminance boundary value is too small, the positive backlight compensation for the foreground target may be excessive, and the image is whitened. Taking all into consideration, the second luminance boundary value is determined through formula (2):

$$C = L_2 - \Delta L \tag{2}$$

In the formula above, C is the second luminance boundary value, $L_2$ is the luminance level of the pixel point corresponding to the crest value of the highest peak in the image histogram, and $\Delta L$ is a luminance level offset and $\Delta L < 0 \leq 30$. Preferably, $\Delta L$ is equal to 8, which brings a good effect of image processing.

In this case, if the $L_2$ value is relatively small, it needs to be certain that the C value is greater than 0 after being calculated through formula (2).

After the first luminance boundary value and the second luminance boundary value are determined, it is necessary to select the first compensation function to perform negative backlight compensation for the pixel points whose luminance level falls within [0, C], and select the second compensation function to perform positive backlight compensation for the pixel points whose luminance level falls within (C, A], where A is the first luminance boundary value and C is the second luminance boundary value. The compensation function needs to fulfill the features of smoothness and non-even increase. If a fixed value or a linear function is used to perform backlight compensation for the image, over-saturation or layering of the image is inevitable. The curve of a power function is smooth, and the function value increase rate is large when the independent variable is small; and the function value increase rate is small when the independent variable is large, which fulfills the backlight compensation requirements. In addition, the high-order function is also suitable for backlight compensation. The quadratic function is less complex and is characterized by non-even increase, and fulfills the backlight compensation requirements. In the embodiments of the present invention, the quadratic function is used as a backlight compensation function, as detailed below:

The first compensation function is shown in formula (3):

$$f_1(x) = mx^2, 0 \leq x \leq C \tag{3}$$

$f_1(x)$ is the first compensation function and m is a pending parameter of the quadratic function.

The second compensation function is shown in formula (4):

$$f_2(x) = k(x-A)^2 + b, C < x \leq A \tag{4}$$

In the formula above, $f_2(x)$ is the second compensation function; k and b are two pending parameters of the quadratic function.

The first compensation function is applied to perform negative backlight compensation for the pixel points whose luminance level falls within [0, C]; the second compensation function is applied to perform positive backlight compensation for the pixel points whose luminance level falls within (C, A]; and no backlight compensation is required for the pixel points whose luminance level is greater than A. To avoid layering of the image after backlight compensation, it is necessary to ensure continuity of the luminance of the entire image after backlight compensation, the luminance of the pixel points whose luminance level is the first luminance boundary value needs to be equal to the first luminance boundary value after backlight compensation, and the luminance of the pixel points whose luminance level is the second luminance boundary value needs to be equal to the second luminance boundary value after backlight compensation, namely, formulas (5) and (6) are fulfilled.

$$f_1(C) = C \tag{5}$$

$$f_2(A) = A \tag{6}$$

Moreover, to ensure continuity, the following formula needs to be fulfilled:

$$f_1(C) = f_2(C) \tag{7}$$

Through formulas (5), (6), and (7), the values of the pending parameters in the functions $f_1(x)$ and $f_2(x)$ can be worked out;

$$m = \frac{1}{C},$$

$$b = A,$$

and k=1/(C−A) The finally obtained two compensation functions are shown in formulas (8) and (9):

$$f_1(x) = \frac{1}{C}x^2, 0 \leq x \leq C \tag{8}$$

$$f_2(x) = (x - A)^2/(C - A) + A, C < x \leq A \tag{9}$$

Figure 5:
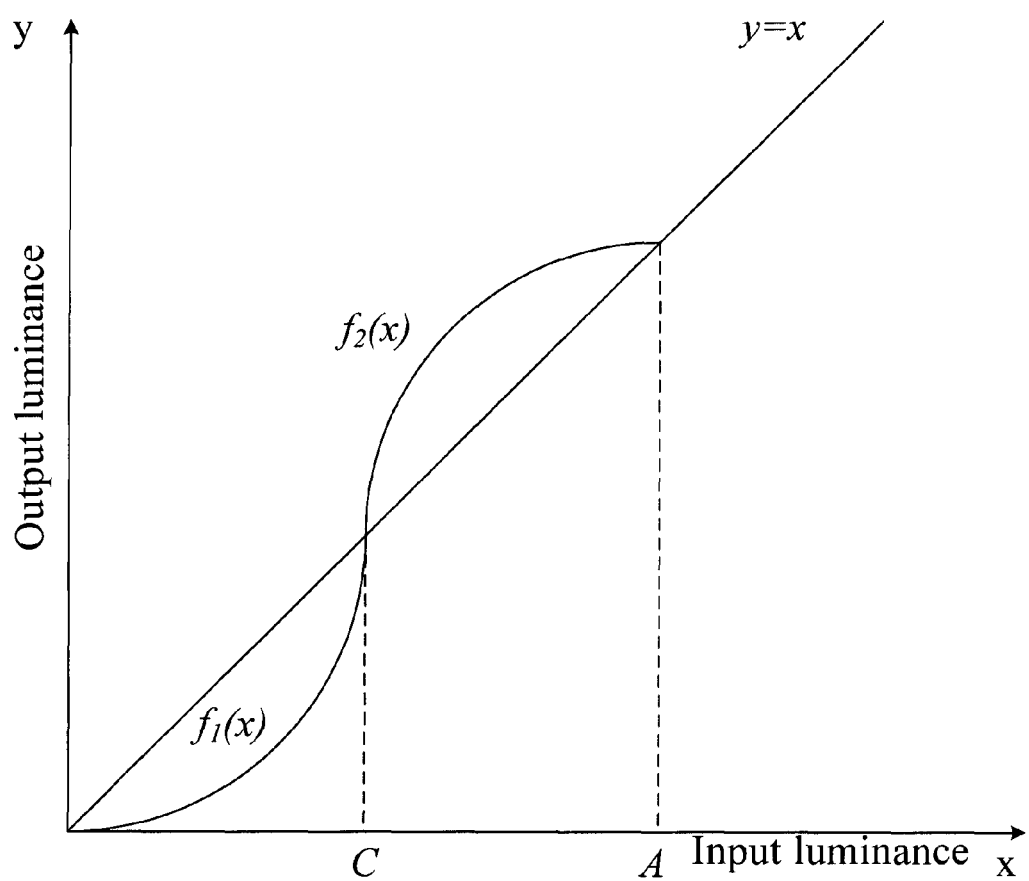
FIG. 5 shows backlight compensation performed for an image through a first compensation function and a second compensation function in a method for processing an image in an embodiment of the present invention.

FIG. 5 shows backlight compensation performed for an image through a first compensation function and a second compensation function in a method for processing an image in an embodiment of the present invention. If no backlight compensation is performed for the image, the input luminance is equal to the output luminance (namely, the input/output curve before compensation in the figure makes y=x). After backlight compensation, the luminance of the pixel points whose luminance falls within [0, C] undergoes negative backlight compensation with the first compensation function, and is less than that before compensation; the luminance of the pixel points whose luminance falls within (C, A] undergoes positive backlight compensation with the second compensation function, and is higher than that before compensation, thus increasing the luminance of the foreground target and decreasing the luminance of the pixel points whose luminance is lower than that of the foreground target. No compensation is performed for the background pixel points, thus improving the image contrast. Because the luminance of the pixel points whose luminance is the first luminance boundary value is equal to the first luminance boundary value after backlight compensation, and the luminance of the pixel points whose luminance is the second luminance boundary value is equal to the second luminance boundary value after backlight compensation, the image is not layered after backlight compensation.

The pixel points whose luminance level is greater than A may undergo proper backlight compensation according to the actual requirements of image processing, without being excluded from the possibility of undergoing backlight compensation. The detailed backlight compensation method is based on the prior art, and is not repeated herein.

The method for processing images in the embodiments of the present invention obtains the first luminance boundary value and the second luminance boundary value, and performs backlight compensation for the pixel points in different luminance ranges with different compensation functions according to the pixel point luminance range determined by such two luminance boundary values, which is nonlinear compensation and does not lead to loss of the chromatic information of the image or too high luminance of the target. Moreover, it is ensured that the luminance of the pixel point whose luminance level is the first luminance boundary value after backlight compensation is equal to the luminance before compensation, and the luminance of the pixel point whose luminance level is the second luminance boundary value after backlight compensation is equal to the luminance before compensation. The method is simple and universally applicable. After backlight compensation, the contrast of the image is high, and the image is free from background overexposure and image layering. The image photographed in a backlight environment is processed properly. The method for processing an image described above is applicable to processing of a single image, for example, an image photographed by a camera. For video image processing, for example, video data photographed by a videorecorder, the video images may be regarded as multiple continuous single-frame images. Scenarios are changing between single-frame images. In this case, the image processing needs to be performed according to the result of detecting the change of the scenarios.

Figure 6:
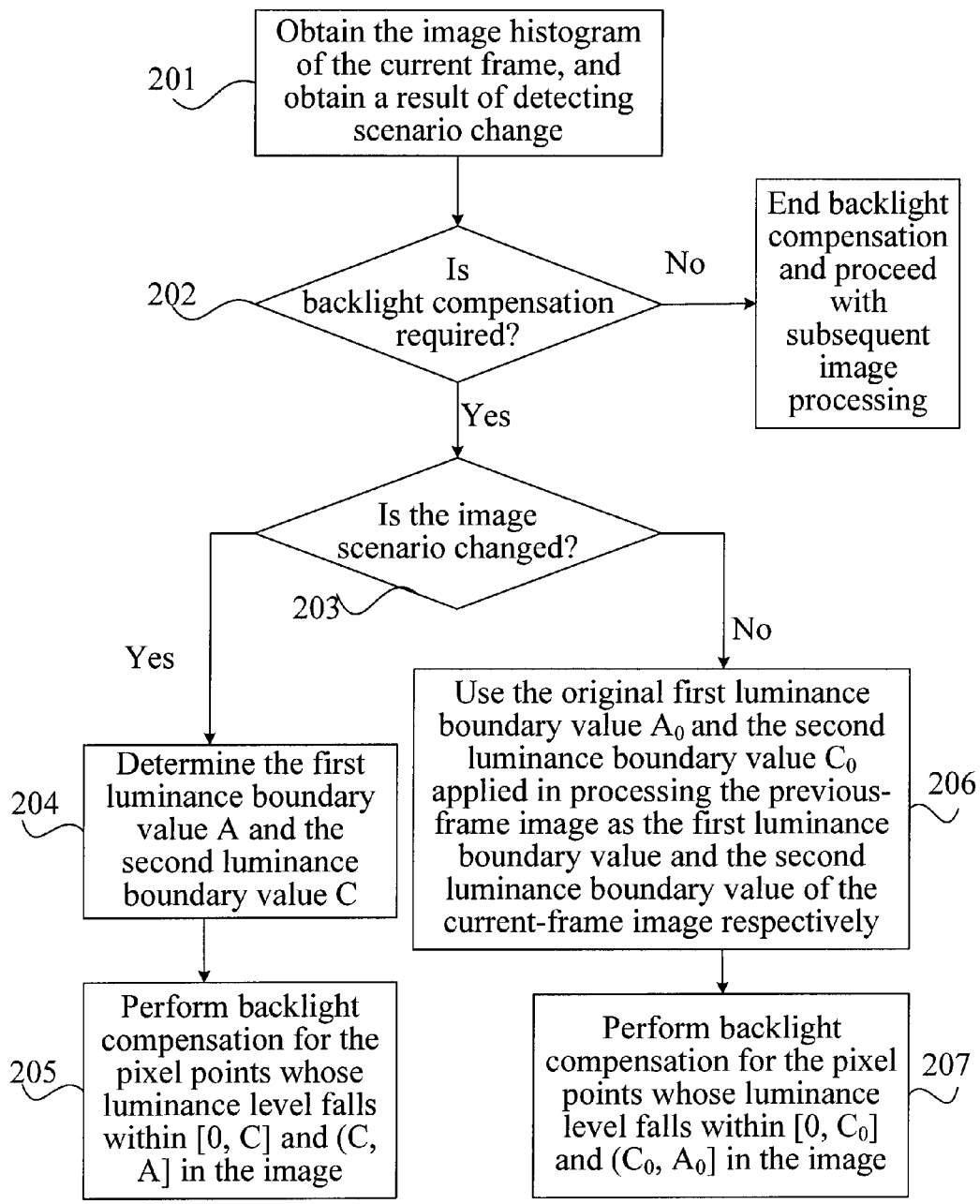
FIG. 6 is a flowchart of a method for processing an image in the second embodiment of the present invention.

FIG. 6 is a flowchart of a method for processing an image in the second embodiment of the present invention. The image processing includes the following steps:

Step 201: Obtain the image histogram of the current frame, and obtain a result of detecting scenario change.

Step 202: Judge whether the image requires backlight compensation, and perform step 203 if the image requires backlight compensation, or end the backlight compensation and proceed with the subsequent image processing if the image requires no backlight compensation.

Step 203: Judge whether the scenario of the image has changed according to the result of detecting the scenario change. Perform step 204 if the scenario has changed, or perform step 206 if the scenario has not changed.

Step 204: Determine the first luminance boundary value A used for deciding whether to perform luminance compensation and the second luminance boundary value C used for deciding whether to perform positive or negative backlight compensation.

Step 205: Perform backlight compensation for the pixel points whose luminance level falls within [0, C] and (C, A] in the image.

Step 206: Use the original first luminance boundary value $A_0$ which is applied in processing the previous-frame image as the first luminance boundary value for processing the current-frame image, and use the original second luminance boundary value $C_0$ which is applied in processing the previous-frame image as the second luminance boundary value for processing the current-frame image.

Step 207: Perform backlight compensation for the pixel points whose luminance level falls within [0, $C_0$] and ($C_0$, $A_0$] in the image.

The second embodiment of the present invention is designed for processing continuous images. The processing of continuous images differs from the processing of a single-frame image in that: After judging whether the current-frame image requires backlight compensation, it is necessary to judge whether the scenario of the current-frame image has changed as against the scenario of the previous-frame image. Scenario change means: The content of the video has changed noticeably. For example, the background of the video is changing while the camera is rotating. In this case, it is necessary to judge again whether the image is in the backlight state and to work out the backlight compensation parameters again. Generally, the percentage of the number of the motional blocks in the image to the total number of blocks of the entire image reveals whether the scenario of the video has changed. When the percentage reaches a specific threshold, it is deemed that the scenario has changed. If the scenario of the current-frame image is different from the scenario of the previous-frame video, it is necessary to determine the first luminance boundary value A and the second luminance boundary value C according to the histogram of the current-frame image, determine the first compensation function and the second compensation function, use the first compensation function to perform backlight compensation for the pixel points whose luminance level falls within [0, C], and use the second compensation function to perform backlight compensation for the pixel points whose luminance level falls within (C, A]. The compensation method is the same as that in the first embodiment and thus the method is not described in detail. In the case that the scenario of the current-frame image is the same as the scenario of the previous-frame image, if the first luminance boundary value and the second luminance boundary value are determined again according to the histogram of the current-frame image, the two parameters of the current-frame image are different from those of the previous-frame image. Consequently, the image sequence blinks after backlight compensation. To prevent image blinking after backlight compensation, the original first luminance boundary value $A_0$ and the original second luminance boundary value $C_0$ applied in processing the previous-frame image are used as the first luminance boundary value and the second luminance boundary value for processing the current-frame image. In this way, the first compensation function and the second compensation function which are determined according to the two luminance boundary values are the same as those of the previous-frame image. Then, the original first compensation function is used to perform backlight compensation for the pixel points whose luminance level falls within [0, $C_0$]; and the original second compensation function is used to perform backlight compensation for the pixel points whose luminance level falls within ($C_0$, $A_0$]. By this means, the image blinking is avoided after backlight compensation is performed for continuous images.

Figure 7:
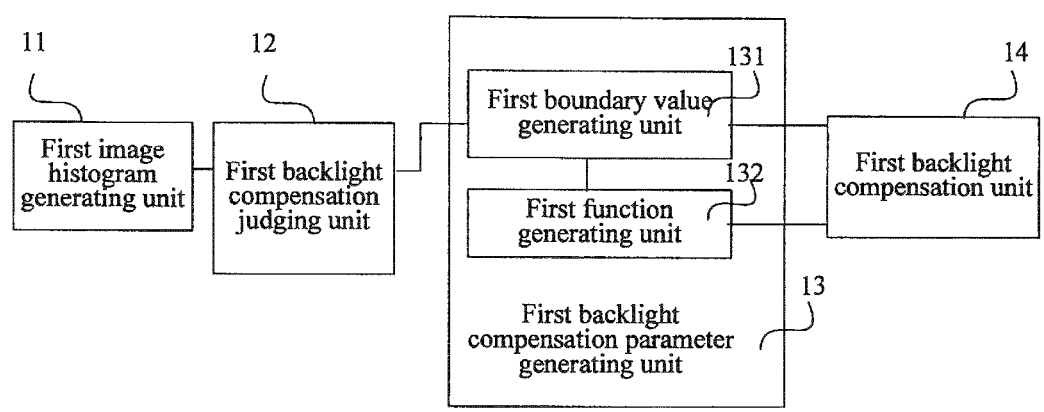
FIG. 7 is a structure of an apparatus for processing an image in the first embodiment of the present invention.

FIG. 7 is a structure of an apparatus for processing an image in the first embodiment of the present invention. The apparatus for processing an image in the first embodiment is adapted to process single-frame images, and includes:

a first image histogram generating unit 11, adapted to generate an image histogram of an image;

a first backlight compensation judging unit 12, connected to the first image histogram generating unit 11 and adapted to judge whether the image requires backlight compensation;

a first backlight compensation parameter generating unit 13, connected to the first backlight compensation judging unit 12 and adapted to generate the first luminance boundary value A and the second luminance boundary value C for backlight compensation; and a first backlight compensation unit 14, connected to the first backlight compensation parameter generating unit 13 and adapted to perform luminance compensation for the image according to the first luminance boundary value and the second luminance boundary value generated by the first backlight compensation parameter generating unit 13.

The first backlight compensation parameter generating unit 13 includes:

a first boundary value generating unit 131, connected to the first backlight compensation judging unit 12 and the first backlight compensation unit 14, and adapted to generate the first luminance boundary value and the second luminance boundary value according to the histogram generated by the image histogram generating unit.

The first backlight compensation parameter generating unit 13 may further includes:

a first function generating unit 132, connected to the first boundary value generating unit 131 and the first backlight compensation unit 14, and adapted to generate the first compensation function and the second compensation function according to the first luminance boundary value and the second luminance boundary value generated by the first boundary value generating unit 131, where the first compensation function and the second compensation function are designed to perform backlight compensation for the image to be processed.

Figure 8:
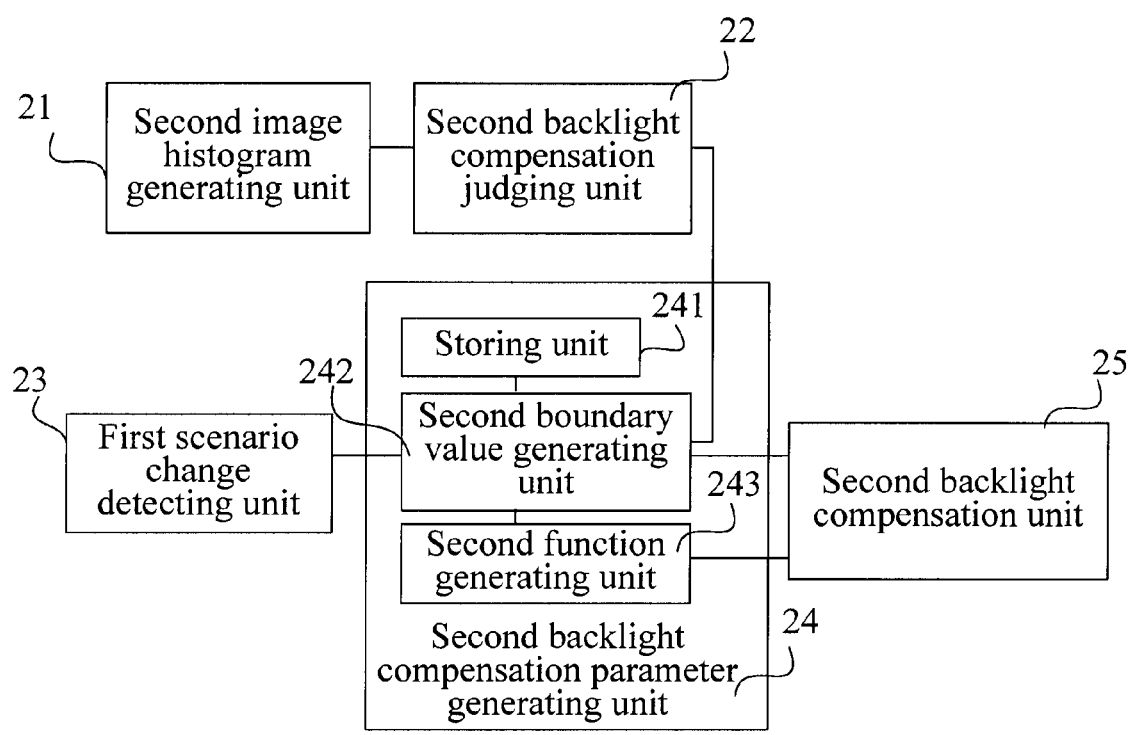
FIG. 8 is a structure of an apparatus for processing an image in the second embodiment of the present invention.

FIG. 8 is a structure of an apparatus for processing an image in the second embodiment of the present invention. The apparatus for processing an image in the second embodiment is adapted to process continuous-frame images, and includes:

a second image histogram generating unit 21, adapted to generate a histogram of an image;

a second backlight compensation judging unit 22, connected to the second histogram generating unit 21 and adapted to judge whether the current-frame image requires backlight compensation;

a first scenario change detecting unit 23, adapted to detect whether the scenario of the current-frame image is different from the scenario of the previous-frame image;

a second backlight compensation parameter generating unit 24, connected to the second backlight compensation judging unit 22 and the first scenario change detecting unit 23, and adapted to generate the first luminance boundary value A and the second luminance boundary value C for backlight compensation; and a second backlight compensation unit 25, adapted to perform luminance compensation for the image according to the first luminance boundary value and the second luminance boundary value generated by the second backlight compensation parameter generating unit.

The second backlight compensation parameter generating unit 24 includes:

a storing unit 241, adapted to store the backlight compensation parameters of the image before the current-frame image, namely, the first luminance boundary value and the second luminance boundary value applied in processing the image before the current-frame image;

a second boundary value generating unit 242, connected to the second backlight compensation judging unit 22, the first scenario change detecting unit 23, and the second backlight compensation unit 25, and adapted to generate the first luminance boundary value and the second luminance boundary value of the current-frame image according to the judgment result of the second backlight compensation judging unit 22 and the detection result of the first scenario change detecting unit 23, or determine the first luminance boundary value and the second luminance boundary value of the previous-frame image as the luminance boundary values of the current-frame image; and a second function generating unit 243, connected to the second boundary value generating unit 242 and the second backlight compensation unit 25, and adapted to generate the first compensation function and the second compensation function according to the first luminance boundary value and the second luminance boundary value generated by the second boundary value generating unit 242, where the first compensation function and the second compensation function are designed to perform backlight compensation for the image to be processed.

For the apparatus for processing an image in FIG. 7 and FIG. 8, if the obtained image does not fulfill the data format required for backlight compensation, the apparatus for processing an image may further include an image preprocessing unit, which is adapted to convert the obtained image into an image data format required for backlight compensation. If the image subsequent to backlight compensation does not fulfill the image format required by the display device, the apparatus for processing an image needs to further include an image postprocessing unit, which is adapted to convert the image subsequent to backlight compensation into an image data format required by the display device.

The method and the apparatus for processing images in the embodiments of the present invention obtain the first luminance boundary value and the second luminance boundary value, and perform backlight compensation for the pixel points in different luminance ranges with different compensation functions according to the pixel point luminance range determined by such two luminance boundary values. Moreover, it is ensured that the luminance of the pixel point whose luminance level is the first luminance boundary value after backlight compensation is equal to the luminance before compensation, and the luminance of the pixel point whose luminance level is the second luminance boundary value after backlight compensation is equal to the luminance before compensation. The method is simple. After backlight compensation, the contrast of the image is high, and the image is free from background overexposure and image layering. The image photographed in a backlight environment is processed properly.

Through the above embodiments, it is understandable to those skilled in the art that the embodiments of the present invention may be implemented through software and a necessary general hardware platform or through hardware only. However, in most cases, software and a general hardware platform are preferred. Based on such understanding, the technical solution of the invention or contributions to the prior art can be embodied by a software product. The software product is stored in a storage medium and incorporates several instructions to instruct a computer device, for example, a personal computer, a server, or a network device, to implement the method provided by each embodiment of the invention.

In view of the above, although the present invention has been described through several exemplary embodiments, the invention is not limited to such embodiments. Any modification, equivalent replacement, and improvement made without departing from the spirit and principle of the present invention fall within the scope of the present invention.

What is claimed is:

1. A method for backlight compensation of an image, comprising:
   generating an image histogram of an image to be processed;
   judging whether the image to be processed requires backlight compensation according to the image histogram;
   if the image to be processed requires the backlight compensation, determining a first luminance boundary value A used for performing the backlight compensation and a second luminance boundary value C used for performing positive or negative backlight compensation; and
   performing backlight compensation for the image to be processed according to the first luminance boundary value A and the second luminance boundary value C;
   wherein judging whether the image to be processed requires the backlight compensation includes:
      obtaining a luminance level of $L_1$ a pixel point corresponding to a crest value of a highest peak with a maximum crest luminance and a luminance level $L_2$ of a pixel point corresponding to a crest value of a second highest peak whose crest luminance level is lower than an average luminance of the image histogram, and
      determining that the image to be processed requires the backlight compensation if $L_1-L_2>K$, wherein K is a fixed luminance difference and $K>0$.

2. The method according to claim 1, further comprising:
   performing convolution and operation for a normalized image histogram through a gate sequence, and finding crests of the highest peak and the second highest peak.

3. The method according to claim 1, wherein the first luminance boundary value A used for performing the backlight compensation comprises:
   using the luminance level greater than luminance of any pixel point of a foreground target in the image to be processed as the first luminance boundary value A.

4. The method according to claim 1, wherein the first luminance boundary value A used for performing the backlight compensation comprises:
   determining the luminance level is greater than luminance of any pixel point of a foreground target in the image to be processed, and the luminance level is less than luminance of a pixel point corresponding to a crest value of a highest peak in the image histogram of the image to be processed; and
   using the luminance level as the first luminance boundary value A.

5. The method according to claim 1, wherein the first luminance boundary value A used for performing the backlight compensation comprises:
   selecting an x-coordinate corresponding to a minimum value point adjacent to a crest value of a highest peak in the image histogram as the first luminance boundary A, wherein the x-coordinate corresponding to the minimum value point is less than an x-coordinate corresponding to the crest value of the highest peak.

6. The method according to claim 1, wherein the second luminance boundary value C used for performing the positive or negative backlight compensation comprises:
   determining the luminance level less than luminance of any pixel point of a foreground target in the image to be processed as the second luminance boundary value C.

7. The method according to claim 6, wherein the luminance level less than the luminance of any pixel point of the foreground target in the image to be processed is determined as the second luminance boundary value C comprises:
   determining the second luminance boundary value C as $L_2-\Delta L$, wherein $\Delta L$ is a fixed luminance level offset.

8. An apparatus for backlight compensation of an image, comprising:
   an image histogram generating unit, adapted to generate an image histogram of an image to be processed;
   a backlight compensation judging unit, adapted to judge whether the image to be processed requires backlight compensation according to the image histogram of the image to be processed;
   a backlight compensation parameter generating unit, adapted to generate a first luminance boundary value A and a second luminance boundary value C for the backlight compensation if the backlight compensation judging unit determines that the image to be processed requires the backlight compensation; and
   a backlight compensation unit, adapted to perform the backlight compensation for the image to be processed according to the first luminance boundary value A and the second luminance boundary value C generated by the backlight compensation parameter generating unit;
   wherein the backlight compensation parameter generating unit comprises:
      a first boundary value generating unit, connected to the backlight compensation judging unit and the backlight compensation unit and adapted to generate the first luminance boundary value A and the second luminance boundary value C according to the image histogram and
      a first function generating unit, connected to the first boundary value generating unit and the backlight compensation unit, and adapted to generate a first compensation function and a second compensation function according to the first luminance boundary value A and the second luminance boundary value C generated by the first boundary value generating unit wherein the first compensation function and the second compensation function are designed the backlight compensation for the image to be processed.

* * * * *

UNITED STATES PATENT AND TRADEMARK OFFICE
CERTIFICATE OF CORRECTION

PATENT NO. : 8,334,925 B2
APPLICATION NO. : 12/875540
DATED : December 18, 2012
INVENTOR(S) : Wei et al.

It is certified that error appears in the above-identified patent and that said Letters Patent is hereby corrected as shown below:

Column 14, line 54, "are designed the" should read -- are designed to perform the --.

Signed and Sealed this
Twelfth Day of March, 2013

Teresa Stanek Rea
*Acting Director of the United States Patent and Trademark Office*